June 23, 1964 R. RICE 3,138,704
PHOTOLOGIC ARITHMETIC CIRCUITS
Filed Nov. 29, 1960 8 Sheets-Sheet 1

INVENTOR
REX RICE
BY [signature]
ATTORNEY

PHOTOLOGIC ARITHMETIC CIRCUITS

Filed Nov. 29, 1960 8 Sheets-Sheet 5

PHOTOLOGIC ARITHMETIC CIRCUITS

United States Patent Office 3,138,704

Patented June 23, 1964

3,138,704

PHOTOLOGIC ARITHMETIC CIRCUITS

Rex Rice, Poughkeepsie, N.Y., assignor to International Business Machines Corporation, New York, N.Y., a corporation of New York Filed Nov. 29, 1960, Ser. No. 72,489
10 Claims. (Cl. 235—176)

This invention relates to an arithmetic system for an electrical computer and more particularly to an arithmetic circuit for an electrical computer employing combinations of lamps and photoconductors as the switching devices.

One object of the invention is to provide a new electrical AND circuit useful in larger arithmetic circuits.

Another object of the invention is to provide an inexpensive, but reliable, electrical arithmetic process system.

Another object of the invention is to provide such a system without the disadvantages of moving mechanical parts.

Another object of the invention is to provide such a system which does not require expensive electronic components.

Another object of the invention is to provide an arithmetic system of the above description which can be directly operable on decimal data and which provides a decimal output so as to avoid data conversions between decimal and binary notations.

Another object of the invention is to provide an arithmetic system which may be operated as a serial adder in a one out of N code such as one out of ten, with improved apparatus for storing and adding carries.

Another object of the invention is to provide an arithmetic system of the above description which may be operated either as a serial adder or a serial subtractor, with improved apparatus for handling carries or borrows.

In carrying out the above objects of this invention, in one preferred form thereof, a photoconductor AND circuit may be provided for combining two functions including an electric voltage responsive light source connected and arrangement to receive a first input function voltage, a photoresponsive device is arranged in proximity to the light source and responsive to light therefrom. The photoresponsive device is electrically connected to receive a second input function voltage and to supply the second input voltage as an output whenever there is a coincidence of the two function voltages.

For a more complete understanding of the invention reference is made to the following description and the accompanying drawings which are briefly described as follows.

Figure 3A:
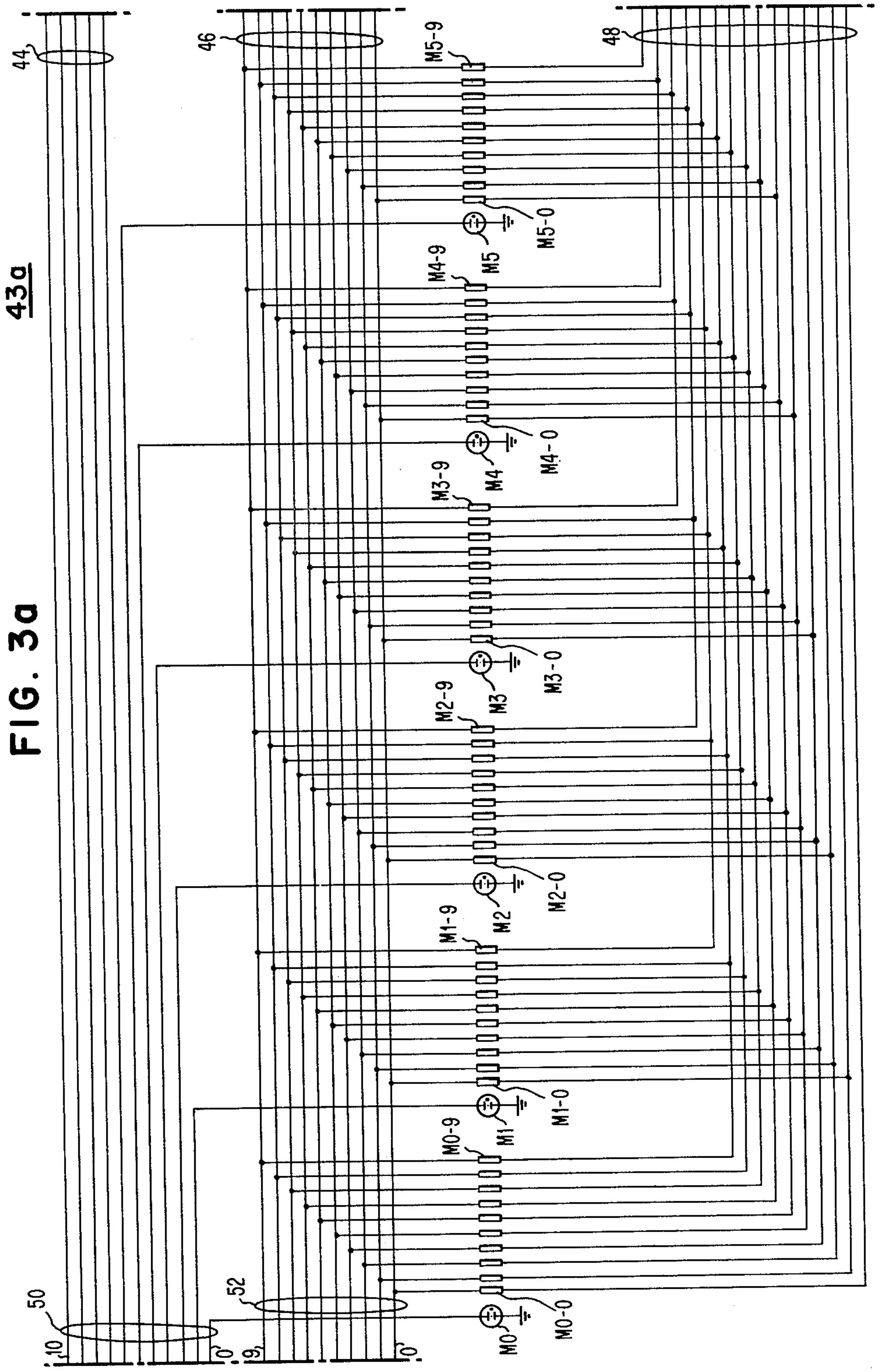
Figure 3B:
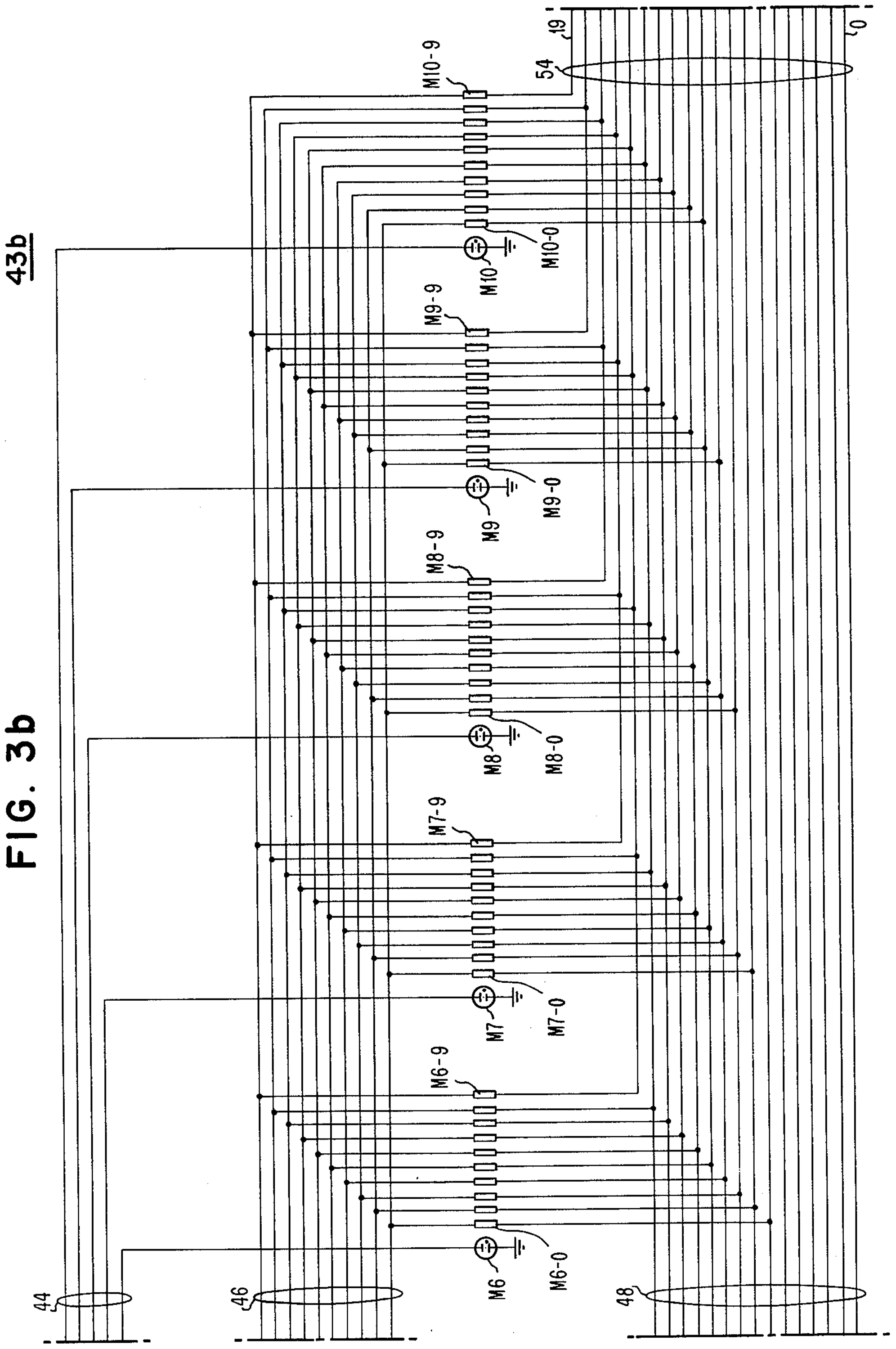

FIGS. 3*a* and 3*b* taken together constitute a schematic circuit diagram of an adder matrix in accordance with the present invention for combining two numbers expressed in a one out of ten code and for obtaining the sum of those numbers in a one out of twenty code.

Figure 4:
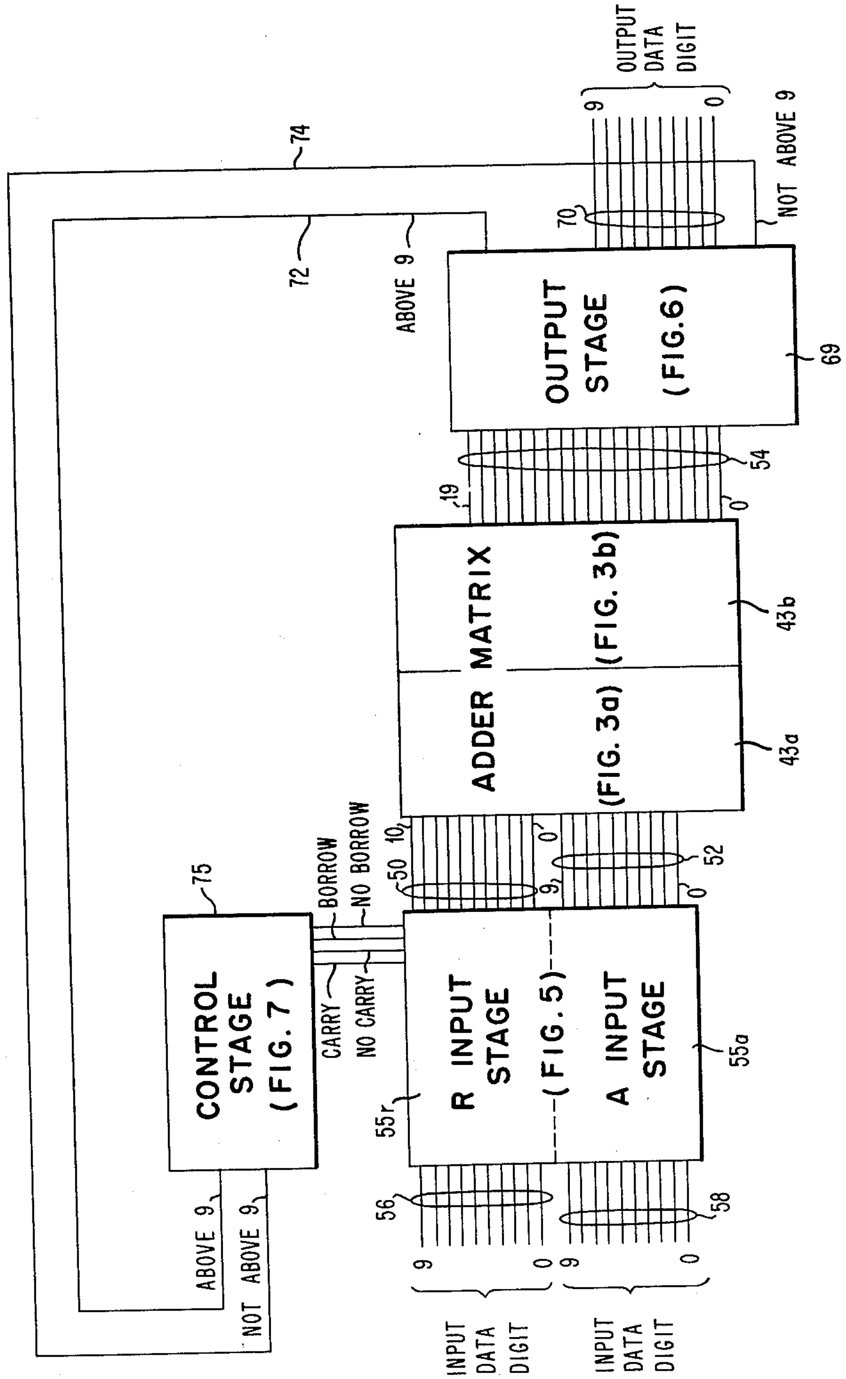

FIG. 4 is a schematic diagram of an arithmetic system in accordance with the present invention, which illustrates how the circuits shown in FIGURES 3*a*, 3*b*, 5, 6, and 7 of the drawings may be combined in a system.

Figure 5:
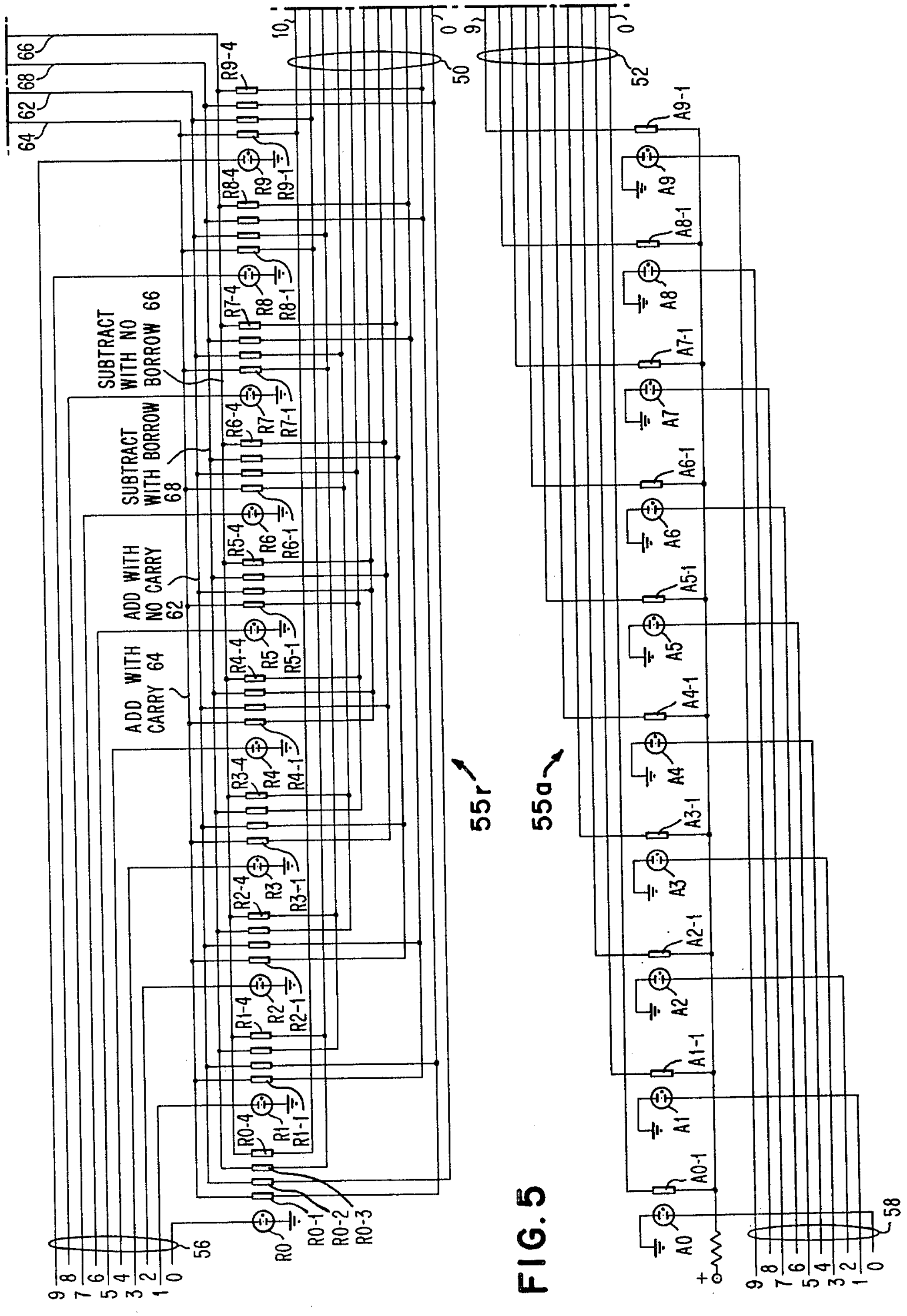

FIG. 5 is a schematic circuit diagram showing input stages for providing inputs to the matrix of FIGS. 3*a* and 3*b*.

Figure 6:
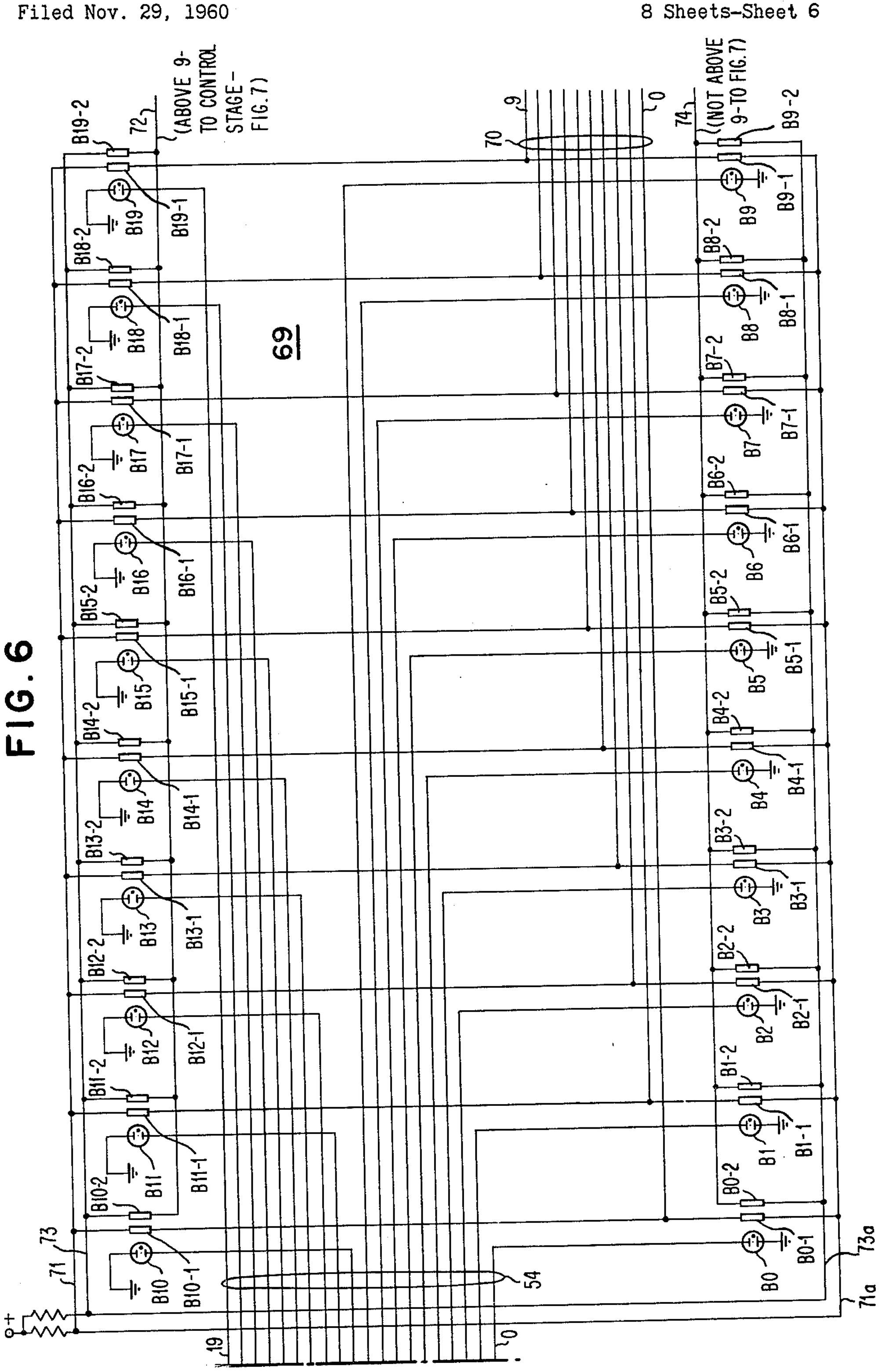

FIG. 6 is a schematic circuit diagram of an output stage for receiving the output from the matrix of FIGS. 3*a* and 3*b* and for interpreting or re-coding that output.

Figure 7:
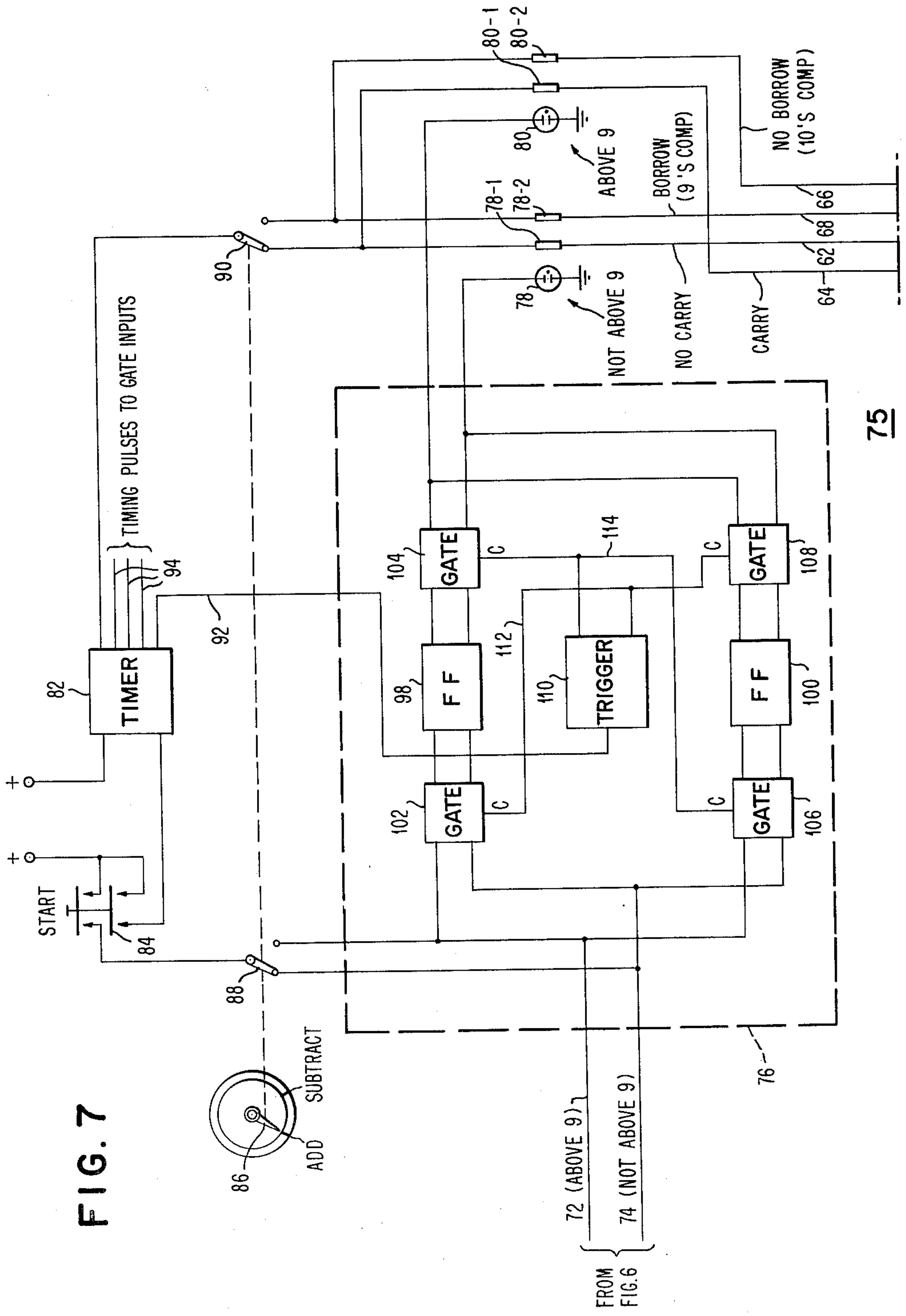

FIG. 7 is a schematic circuit diagram of a control stage for the system shown in FIG. 4 which controls the starting, stopping, and the sequence of operations of the system, and which stores and transmits the carries and borrows.

Figure 8:
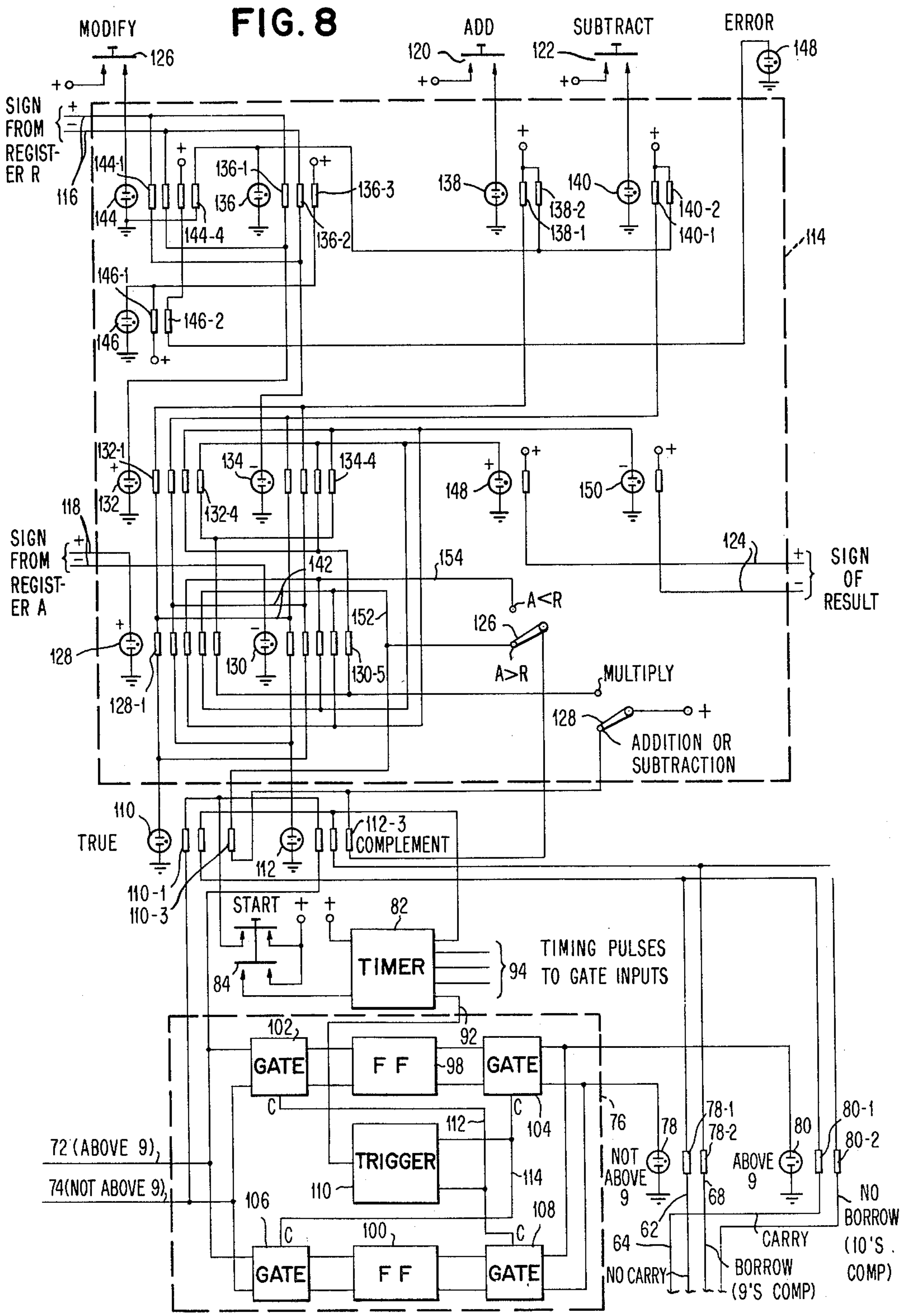

FIG. 8 is a schematic circuit diagram of a modified control stage which can be used in place of the control stage of FIG. 7 and which includes a switching system for receiving information as to the algebraic signs of the data received and for determining whether to add or subtract and for determining the sign of the result.

Figure 1:
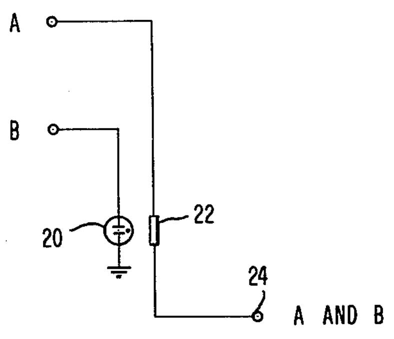
FIG. 1 is a schematic circuit diagram of a basic AND circuit employed in the present invention.

Referring more particularly to FIG. 1, there is shown a basic AND circuit which is employed extensively in the systems of the present invention. In this AND circuit, an electric voltage responsive lamp 20 is illuminated whenever there is an input voltage available at input terminal B. The lamp 20 is positioned to illuminate a photoconductor 22, which reduces the resistance of the photoconductor 22 so as to transmit any voltage, and the resulting current, which is available at terminal A to the output terminal 24. It is thus apparent that when input voltages are available at both terminals *a* and *b*, there is an output available at output terminal 24. The output at terminal 24 thus represents the Boolean function A and B.

Figure 2:
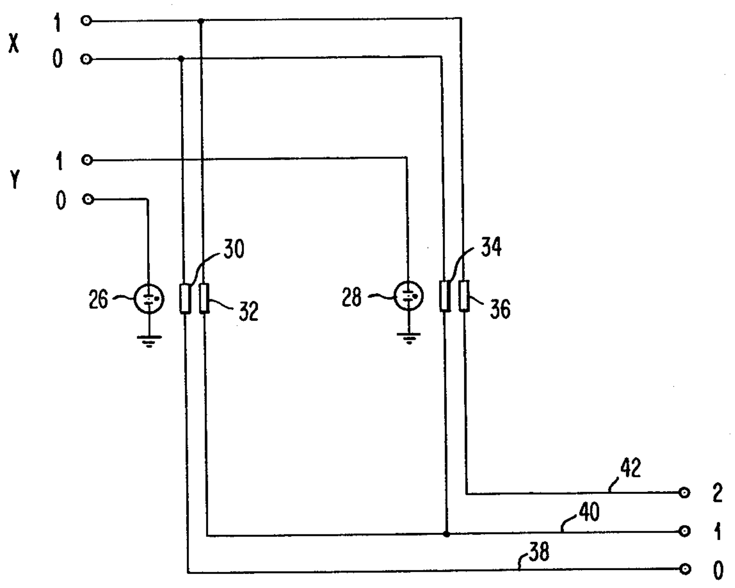
FIG. 2 is a schematic circuit diagram illustrating an elementary form of the adder circuit of the present invention for combining two binary numbers X and Y.

The basic circuit FIG. 1 can be expanded as shown in FIG. 2 to produce a binary adder matrix in which each of the input variables is expressed in terms of a signal on one out of two input signal lines. Thus, a signal voltage on terminals X–0, and Y–0 respectively represent 0 inputs for these functions while voltages on X–1 and Y–1 terminals represent 1 value inputs for these respective functions. Connected to the Y–0 terminal is the lamp 26 and connected to the Y–1 terminal is the lamp 28. Each of lamps 26 and 28 have associated therewith photoconductors which are respectively connected to the X–0 and X–1 input terminals. Thus, photoconductors 30 and 32, which are arranged in proximity to lamp 26, are respectively connected to the X–0 and X–1 terminals, while photoconductors 34 and 36 which are arranged in proximity to lamp 28 are respectively connected also to the X–0 and X–1 terminals. It is thus apparent that with a signal on Y–0 terminal which lights lamp 26, the sum value will depend on the signals available on the X input terminals transmitted to photoconductors 30 and 32. With a signal available on the X–0 terminal, a signal path will exist through photoconductor 30 to provide an output on the 0 output terminal 38. With an input signal at X–1, a path will be provided through photoconductor 32 to the 1 value output terminal 40. If the value of the variable Y is one, as manifested by a signal on the Y–1 terminal, then lamp 28 will be illuminated instead of lamp 26. Then a concurrent signal on the X–0 terminal will provide an output through photoconductor 34 to the 1 output terminal 40. But if the X value is one as indicated by voltage on the X–1 terminal, the signal path will be through the photoconductor 36 to the 2 output terminal 42.

The binary matrix of FIG. 2 can be expanded to form a decimal matrix for adding two decimal digits expressed in a one out of ten code as shown in FIGS. 3*a* and 3*b*. This decimal matrix will be explained more fully below.

In FIGS. 1 and 2 and in the corresponding parts of subsequent figures of the drawings while not shown, it is understood that there is an additional separate impedance connected between each of the output terminals 24, 38, 40, and 42 and ground. Each of these load impedances has a value which is low compared to the dark impedance of the associated photoconductor so that if the photoconductor is dark, the associated output terminal is held near ground potential. On the other hand, each of these load impedances is chosen to be relatively high with respect to the illuminated impedance of the associated photoconductor so that whenever the photoconductor is illuminated, the associated output terminal is at a potential near the input potential. It will be understood that these load impedances may consist of the internal impedance of the load devices and apparatus to which the network is connected.

Throughout the various figures of the drawings, the small rectangular symbols employed for photoconductor elements, such as 22 and 30 through 36 in FIGURES 1 and 2, will be used to signify devices which have photoresponsive properties. Although the term "photoconductive" is used to describe such devices it should be emphasized that devices of this description as employed in the systems of the present invention are really more accurately described as impedances which achieve a substantially reduced impedance value when they are illuminated. Thus it is contemplated that the impedance of one of these devices may be at least in the order of 200 megohms when not illuminated. But, when it is subjected to illumination its resistance may drop to a typical value in the order of 50,000 ohms and very seldom will the illuminated impedance go below a value of 10,000 ohms. Thus, it is to be seen that a device having a minimum resistance of thousands of ohms, although commonly referred to as a photoconductor, should be more accurately described as an impedance having photoresponsive properties. However, the term "photoconductor" and the like is used in this specification, keeping these qualifications in mind. In the descriptions of the circuits which follow, for convenience, circuit paths will often be described as "completed" by the illumination of a particular photoconductor. It will be understood that this is not strictly correct because such a statement really means that a circuit path of lowered impedance is created by illumination of a photoconductor in a circuit which already exists.

Photoconductive devices having impedance characteristics as described above are commercially available. For instance, one such device may be purchased from the Clairex Corporation, of 50 West 26th Street, in New York city, under model number CL3A.

The typical impedance of the photoconductor as indicated above, at 50,000 ohms when illuminated, is applicable when the illumination is from a neon glow lamp positioned within reasonable proximity to the photoconductor. Small, inexpensive neon glow lamps which are suitable for this purpose are commonly available. A typical device of this kind is available for instance from the General Electric Company under Model No. NE-2. Such a device may require about 70 volts to initiate glow conduction when new, but after appreciable aging has occurred, the firing voltage may advance to the order of 115 volts. After the lamp has become illuminated, a negative resistance effect is to be observed such that the voltage across the glow lamp may drop to about 55 volts. As the lamp ages, this voltage also rises to a maximum value in the order of 100 volts. The current required for such a neon lamp may vary from one quarter of a milliampere to one milliampere.

It will be appreciated that various other voltage responsive light source devices may be employed and that other photoresponsive devices may be used to detect the illumination from such devices. For instance, the voltage responsive light sources might be electroluminescent devices, or incandescent filament devices, or devices employing gaseous discharges to derive illumination from fluorescent coatings. In each instance, photoconductive devices would be selected which are particularly responsive to the spectrum of light emitted by the light sources employed. Fortunately, the neon lamps mentioned above and the phootconductive devices mentioned above work well together. Accordingly, the neons are preferred and the light sources in the present specification are all indicated as being neon light sources, but it will be understood that other sources could be employed if desired.

One important advantage of the neon glow lamp as an electrical voltage responsive light source in the present system is the fact that it remains substantially completely dark until its firing voltage threshold is achieved, at which time it suddenly provides substantially full output illumination with a reduced voltage requirement. This characteristic is very desirable because it prevents false operation as long as the voltage is below the threshold value. It also provides for positive operation whenever the voltage goes above the threshold.

With neon glow lamps, it is generally necessary that some series impedance be employed, as well as some shunt impedance. The value of each of the shunt impedances is preferably about one megohm. This one megohm shunt across each neon serves to set a maximum impedance for the neon with respect to the remainder of the circuit. It will be appreciated that the circuits providing energization for lamps 20, 26 and 28 in FIGS. 1 and 2 may be of a complex nature and that the series impedances may therefore be remote from the input terminals 10 through 26 and in series with other circuit components which do not form part of this invention and are not shown. Although impedance values for the various circuit components are not specified, it will be understood that whenever operation is required to provide output illumination, the series impedances for the various neons will be so chosen as to result in a neon current in the order of one milliampere.

In order to simplify the drawings and make them clearer and more easily understood the lamp shunt and series impedances are omitted from the drawings, but it will be understood that such impedances are to be employed in the practical embodiments of the invention. Also the convention will be employed that each photoconductor is arranged to be illuminated only by the first light source to the left of that photoconductor and in horizontal alignment therewith. Furthermore, in all of the embodiments of the invention which are here disclosed, each photoconductor is arranged for illumination from only one light source.

Also, to further simplify the drawings, the power supply connections are not wired in, either at the common ground connection or at the high voltage connections. The common ground connections are indicated conventionally by the ground symbol, and the high voltage connections are indicated by a terminal symbol with a + sign. The value of the supply voltage may be selected to conform to the impedance values and the current requirements of the circuit design. A good workable value of supply voltage has been found to be about 300 volts. When employing neon lamps as the light sources, it has been found desirable to employ a direct current power supply source, or an alternating current power supply at a frequency of about 1000 cycles. Wtih other light sources, other voltages and frequencies may be employed. Conventional sources of power may be employed to obtain satisfactory operation of the systems of the present invention.

As mentioned above, FIGURES 3*a* and 3*b*, taken together, show a decimal adder matrix employing neons and photoconductors for the addition of two decimal digits, each expressed in a one out of ten code. FIGURES 3*a* and 3*b* are to be arranged together, with FIGURE 3*a* on the left and FIG. 3*b* on the right as indicated for instance in the central portion of FIG. 4. Thus, multiple connections respectively indicated at 44, 46 and 48 at the right margin of FIG. 3*a* connect with correspondingly numbered connections at the left margin of FIG. 3*b*. The neon lamps in FIGURES 3*a* and 3*b* are respectively numbered M0 through M10 each with prefix "M" plus a number to correspond to the eleven possible values of one of the decimal numbers to be added as indicated by a voltage signal on one of the eleven input lines indicated at 50 at the left margin of FIG. 3*a*. These input lines 50 represent the decimal value of a digit R, the lowermost line which is labeled "0" representing a "0" decimal value and the successively higher lines each representing one digit greater up to the top line which indicates a decimal value "10." The other decimal quantity to be added, digit A, is also supplied to the matrix in the one out of ten code on the ten lines indicated at 52. Again, the lowest input line of group 52 represents the value "0" and each successively higher value represents one higher decimal digit up to the top line which indicate "9."

Associated with each of the neons M0 through M10 there are ten photoconductors which are respectively connected to the input lines 52. For convenience, each of the photoconductors will be referred to by the designation legend of its associated neon plus a suffix which is the number corresponding to the value of digit A which it transmits. Thus, reading from left to right, the photoconductors associated with neon M0 are M0–0 through M0–9. Similarly, the photoconductors associated with neon M1 will be referred to as M1–0 through M1–9, etc.

The matrix is provided with 20 output connections indicated as having values 0 through 19 in group 54 at the right margin of FIG. 3*b*. An inspection of this matrix circuit will show that whenever operating voltages are present concurrently on one of the R input lines 50 and one of the A input lines 52, a voltage will appear on one of the output lines 54, and the output line on which that voltage appears will represent a value which is the sum of the values indicated by the decimal inputs at groups 50 and 52. For instance, an R value of 5 indicated by a signal on the 5 line of group 50 will light neon M–5. A concurrent signal on the 3 line of group 52, indicating a value of 3 for A will cause a signal to be transmitted through the M5–3 photoconductor to the eight sum output line of group 54. Similarly, an input value for R of ten as indicated by a signal on line 10 of group 50 will light neon M10 and a concurrent signal value for A of 9 as indicated by a signal on the 9 line of group 52 will then be transmitted through photoconductor M10–9 to the 19 output line of group 54. In a like manner, any other combination of decimal inputs will result in a corresponding sum output value. It will be appreciated that if the connections of the adder matrix of FIGURES 3*a* and 3*b* were changed so that the ten input connections 52 were all connected to lamps instead of to photoconductors, and the eleven input connections 50 were all connected to photoconductor sets instead of to lamps, the matrix would be slightly changed in that only ten lamps would be required and eleven, instead of ten, photoconductors would be required in each set of the photoconductors associated with each lamp. It will be apparent also that the matrix of FIGURES 3*a* and 3*b* could be modified to generate combination functions other than sums.

FIGURE 4 illustrates in schematic form the organization of an adder processing system in accordance with the present invention which incorporates the matrix of FIGURES 3*a* and 3*b* (43*a* and 43*b*), as just described, and shows how the input stage circuits of FIGURE 5 (55*r* and 55*a*), the output stage circuits of FIGURE 6 (69) and the control stage circuits of FIGURE 7 (75) may be combined with the adder matrix to form this system. As indicated in FIGURE 4, two data input digits are respectively supplied in the one out of ten code to the R and A input stages where they are re-coded or modified, if necessary, and then transmitted at connections 50 and 52 to the adder matrix. The sum output from the adder matrix, having the possible values from 0 through 19, is supplied from connections 54 to the output stage (FIGURE 6) where it is recoded into a one out of ten sum digit plus a one out of two coded signal indicating whether or not the raw sum at connections 54 was above the value of 9. This signal is used in the control stage of FIGURE 7 to determine whether or not a carry signal is to be supplied to the input stages if the system is performing addition, or to determine whether or not a borrow is to be supplied to the input stages if the system is performing subtraction. The carry or borrow signals are used to modify one of the input digits on the next serial addition cycle to give effect to the carry or borrow from the addition of the last prior digits. This feature of the invention will be explained more fully below.

Referring to FIGURE 5 in more detail, there are shown the R input stage and the A input stage respectively indicated as a whole at 55*r* and 55*a* which respectively are arranged to supply the R value on the group of lines 50 and the A value on the group of lines 52 indicated at the right margin of FIGURE 5 and intended to be connected to the corresponding groups at the left margin of FIGURE 3*a*. The basic or raw input decimal digit data is supplied in the one out of ten code to the R and A input stages on the line groups 56 and 58. Following the convention adopted in connection with the matrix, the neon lamps of the R input stage are designated R0 through R9 to correspond to the decimal values of the members of the input line group 56 to which they are connected. Similarly, the input lines 58 to the A input stage which are respectively assigned the values of 0 through 9 are connected to energize neon lamps respectively designated A0 through A9.

In the A input stage 55*a* it is apparent that a simple driving or amplifying function is performed. Power is continuously supplied to all of the A input stage photoconductors A0–1 through A9–1 from a power bus 60, so that whenever a decimal input voltage appears on one of the input connections 58, a corresponding output voltage appears on one of the connections 52. To be more specific, for instance, an input signal on the 1 line of group 58 lights neon A1 which illuminates photoconductor A1–1 which thus supplies a voltage from bus 60 through photoconductor A1–1 to the 1 line of group 52. It will be appreciated that if the driving or amplifying function is not required this stage could be eliminated and the input connections 58 could be directly connected to the corresponding output connections 52.

A similar direct transmission of the R input digit is accomplished by the R input stage 55*r* whenever power is applied to the "no carry" bus 62. As is apparent from the drawing, such power is supplied to the upper terminal of each of the photoconductors R0–2 through R9–2. It will be seen that these photoconductors are connected to transmit the true value of the input digit R to the output connections 50 to satisfy the condition where the system is being used for an addition operation and no carry from a previous decimal order is required.

When a carry from the previous decimal order is required, bus 64 is energized instead of bus 62, and this places power on the upper terminal of each of the photoconductors R0–1 through R9–1. The output connections of each of these last-named photoconductors supply a signal to a set of connections 50 which represent the decimal value equal to the input decimal value at 56 plus one to represent the carry. Thus, for instance, an input signal on the one value line of input connections 56 which lights lamp R1 causes the completion of a circuit through photoconductor R1–1 to the 2 value line of connections 50. Similarly, an input signal on the 9 line of set 56 results in an output signal on the 10 line of connections 50. It will be recognized that although there are only ten possible inputs in the input connections 56, because of the possibility of a carry which is added to the 9 input, a "10" value line must be provided in the connections 50 so that there are eleven possible output values in the connections 50, including the "0" value.

The system of the present invention may also be used for subtraction by the commonly understood method of adding complements. For this purpose, instead of energizing busses 62 or 64, bus 66 may be energized for a digit subtraction where no borrow is required, and bus 68 may be energized alternatively where a borrow for a previous order of subtraction is required. Bus 66 applies voltage to the fourth photoconductor of each set, respectively designated R0–4 through R9–4, and these photoconductors are connected to supply the tens complement of the input data digit fed into the R input stage at input connections 56. Thus, for instance, an input voltage on the 8 line of group 56 lights the R8 lamp which causes a completion of the circuit from the bus 66 through photoconductor R8–4 to the 2 output line of group 50. Thus, a 2 value output, which is the tens complement of 8, results from the 8 value input. If a borrow is required from the previous decimal subtraction, bus 68 is energized instead of bus 66 and the circuits completed through photoconductors R0–3 through R9–3 provide the nines complement on connections 50. Thus, for instance, an 8 input, lighting lamp R8, results in a 1 value output at connections 50, instead of the previous 2 value output. The appropriate signal for one of the busses 62 through 68 is supplied from the control stage shown in FIGURE 7 which will be described more fully below. These bus signals may be referred to hereinafter as fuction selection signals.

Assuming that the function selection signals on busses 62 through 68 are stronger than the R value input signals on connections 56, the R input stage **55*r* also serves the purpose as a driver or amplifying stage as previously explained for the A input stage 55*a*. It will be appreciated however, that if the signals on connections 56 are actually the stronger signals, or if no driving function is required, then the R input stage 55*r* can be modified by providing only four lamps respectively connected to the function selection signal busses 62 through 68, each of the four lamps having ten photoconductors associated therewith and individually connected to the various input connections 56**.

The various possible outputs from the R input stage **55*r* available at connections 50 may be referred to as "R functions" since they are all functions of the R input value available at input connections 56**.

Similarly, recognizing that functional modifications of the A input value could be provided for the A input stage **55*a*, the A stage output available at connections 52** will be referred to as the "A function." In this context, the term "function" is used to refer to the true value, or identity, as well as to various modified function values.

FIGURE 6 shows the output stage of the system of FIG. 4 indicated as a whole at 69. This stage is arranged to receive the sum at connections 54, shown at the left margin of FIG. 6, from the matrix output connections 54 shown at the right margin of FIG. 3*b*. Since this sum has any one of twenty possible values, it is not in a true one out of ten code. The output stage of FIG. 6 converts the sum to an appropriate one out of ten code digit which is indicated at output connections 70, and at the same time, provides an ouput at the output connections 72 and 74 indicating whether the sum is above, or not above, nine. The "above 9" or "not above 9" outputs on connections 72 and 74 are connected to the control stage of FIGURE 7 for the purpose of determining whether or not there should be a carry to the next higher order digit which is to be processed, or a borrow from that next higher order digit in the case of subtraction.

The 0 through 19 value connections 54 are respectively connected to energize the lamps B0 through B19. The lamps B0 through B9, which represent values which are not above 9, are arranged at the lower portion of the circuit, and the lamps B10 through B19, which represent the values above 9, are arranged at the upper portion of the circuit. Each of these B lamps has associated with it two photoconductors which are respectively designated B0–1 through B19–1 and B0–2 through B19–2. The B0–1 through B19–1 photoconductors are each connected to supply an output to the appropriate decimal sum output connection of the group 70 from power busses 71 and **71*a*. The B10–2 through B19–2 photoconductors are connected to supply an output signal to the "above 9" line 72 from a power bus 73. And the B0–2 through B9–2 photoconductors are connected to supply an output signal to "not above 9" output line 74 from a power bus 73*a*. The operation of this output stage is apparent from the above description. For instance, if there is a signal received on the 3 line of group 54, lamp B3 will be lighted and photoconductor B3–1 will provide a signal to the 3 output line of group 70. Also, photoconductor B3–2 will supply an output signal to the "not above 9" output line 74. However if a signal is received on the 13 value line of group 54, then lamp B13 will be illuminated and the sum value line 3 of group 70 will again be energized, this time through photoconductor B13–1. And the "above 9" output line 72 will be energized through photoconductor B13–2. Thus, it will be apparent that if the system is operating to add a decimal number, the present digit sum will appear in the one out of ten code on the output lines 70, while the information as to whether or not a carry is to be taken to the next higher order is provided by the lines 72 and 74, a "carry" being indicated by a signal on the "above 9" line 72, and "no carry" being indicated by a signal on the "not above 9" line 74**.

FIGURE 7 shows the control stage of the system of FIG. 4 indicated as a whole at 75. The control stage not only starts and stops the system, and supplies operating pulses thereto, but it also receives the information from connections 72 and 74 from the output stage as to whether or not the result of any immediately prior digit addition was above nine. This information is supplied at the connections 72 and 74 indicated at the left margin of FIG. 7. This information is stored for one digit operation cycle of the serial adder and is then used as a factor in determining which of the four busses 62 through 68 of the R input stage should be supplied with an operating pulse. These bus connections 62 through 68 are shown in the lower right hand corner of FIG. 7 where they are arranged to connect to the corresponding busses in FIG. 5.

The storage of the "above 9" or "not above 9" information and the regeneration of that information one pulse time later is taken care of by a one-pulse storage unit indicated generally within the box 76. The regenerated information from delay unit 76 causes the lighting of the "not above 9" lamp 78, or the "above 9" lamp 80. The periodic operation of the delay unit 76 and of the rest of the system is controlled by a conventional commutator timer indicated generally at 82. The timer 82 and the system may be started by a manual start switch 84. An "Add" or "Subtract" selector switch 86, having two transfer contact switch levers 88 and 90, provides a manual setting for the system to select an "Addition" operation, in which the two numbers fed to the A and R input stages are added to one another, or to select a "Subtract" operation in which the number fed to the R input stage is subtracted from the number fed to the A input stage.

The timer 82 is of conventional construction and it is capable, when once started by momentary closure of the associated start switch 84, of emitting a series of pulses of sufficient number to cause the system to operate in a serial fashion to add or subtract all of the digits in each of the data numbers supplied to the A and R input stages, at the rate of one digit for each pulse time. Such pulses are supplied to the delay unit 76 through a connection indicated at 92. Other pulses necessary to gate the delivery of data digits to the input connections 56 and 58 of the R and A input stages of FIG. 5 may be supplied from other output connections of the timer indicated at 94. The gating apparatus may be of conventional construction and is not shown.

Periodic operating pulses are also supplied from timer 82 through connection 96 to the "add-subtract" switch lever 90. Lamps 78 and 80 each have associated therewith two photoconductors respectively designated 78–1, 78–2, 80–1, and 80–2. When the switch 86 is in the "Add" position, the contact lever 90 is in the position shown to supply a voltage pulse to the "Addition" photoconductors 78–1 and 80–1. If the signal from the delay unit 76 indicates a prior sum which was not above 9, which thus lights lamp 78, then the voltage signal pulse from switch 90 is supplied through photoconductor 78–1 to the "no carry" bus 62. However, if the previous sum was above 9 so as to light lamp 80, the voltage signal from switch 90 is supplied through photoconductor 80–1 to the "carry" bus 64.

If the switch 86 is in the "Subtract" position, then the pulse at switch lever 90 is supplied to the subtract photoconductors 78–2 and 80–2. Then a borrow signal is provided on bus 68 through photoconductor 78–2 if the previous sum was not above 9, and alternatively a no borrow signal is provided through photoconductor 80–2 to bus 66 if the previous sum was above 9. This is obviously appropriate, for in the method of accomplishing decimal subtraction by the addition of a complement, a sum above 9 indicates that no borrow is necessary, and a sum not above 9 indicates that a borrow is necessary.

In each single word multiple digit operation, in which each pair of multiple digit decimal numbers is added, there will be no initial output pulse from the output stage of FIGURE 6 so that there will not be any above 9 or not above 9 signals on lines 72 and 74. Accordingly, the "add-subtract" switch lever 88 and the associated contacts of the start switch 84 are arranged to provide an appropriate initial pulse to the delay unit 76 in order to assure an appropriate initial illumination of one of the lamps 78 or 80. Since there should be no carry in the initial operation in the addition cycle, when "Add" is selected, switch lever 88 is connected to apply an initial pulse to the "not above 9" connection 74. Similarly, since there can be no borrow on the initial digit operation when the circuit is operating to subtract, when "Subtract" is selected, switch lever 88 is arranged to supply this initial pulse to the "above 9" input connection 72.

The delay unit 76 includes two alternately operable flip-flop circuits 98 and 100 either of which stores the "above 9" and "not above 9" information. Each of these flip-flop circuits has associated therewith input and output gates respectively designated 102 through 108. A trigger circuit 110 controls the operation of the gates 102 through 108 in response to pulses from timer 82 received through connection 92 by means of alternating trigger output pulses on gate control busses 112 and 114. Accordingly, whenever the trigger 110 receives a pulse from timer 82, an output control signal results on whichever one of the control busses 112 or 114 which was not energized on the last pulse.

The operation of the delay unit 76 may be illustrated as follows: Suppose the present output pulse for the trigger 110 is on the control bus 112. This will open input gate 102 from lines 72 and 74 to flip-flop 98 to store the present "above 9" or "not above 9" signal therein. The control pulse on bus 112 will also open output gate 108 from flip-flop 100 so as to read out the prior "above 9" or "not above 9" signal from flip-flop 100 to the lamps 78 and 80. When the next pulse is received by trigger 110 from the timer 82, the gate control bus 114 will be energized to open output gate 104 of flip-flop 98 and input gate 106 of flip-flop 100. This will provide a read out of the information stored in flip-flop 98 through gate 104 and a read in, through gate 106, of the incoming "above 9" or "not above 9" information to the flip-flop 100. The next pulse will again be on bus 112. It will thus be apparent that each "above 9" or "not above 9" bit of information will be stored for one pulse time in either one of the flip flops 98 or 100, and will be emitted from the delay unit 76 when needed during the next pulse period.

It will be understood that the various pulses emitted by the timer 82 do not necessarily begin and end concurrently, but the timing of these pulses must be properly coordinated with the operating speeds of the components of the delay unit 76, and with the entire adder system including the operating loop which commences with the busses 62 through 68 and ends with the "above 9" and "not above 9" lines 72 and 74. Since the components of delay unit 76 may be of conventional construction, the details of these circuits are not shown here.

In cases where the operation is to be subtraction rather than addition, it is necessary to be sure that the larger number is fed into the system through the A input stage and the smaller number to be subtracted from it is fed into the R input stage because only the R input stage is capable of converting an input to the complement form. However, it will be obvious that the A input stage of FIG. 5 could be easily modified along the lines of the R input stage to provide the complement value of the A input, as well as the true value, if necessary. It is possible also to proceed with the subtraction operation even though the A input is smaller than the R input. However, in that case the output result which is obtained will be in complement form rather than in true form, and recomplementation will be necessary. This can be done by feeding the result back in through the R input stage and complementing that input while continuously feeding zeros in at the A input stage. If the A input stage is equipped for complementing, this recomplementing may be accomplished by recirculating the result through that stage and feeding zeros through the R stage.

In a valuable alternative embodiment of the present invention employing a modified control stage as shown in FIG. 8, it is possible to perform algebraic addition and subtraction and to have the machine itself determine whether to add the true or complement value of the R data word and also to determine the sign of the result. In this alternative embodiment, the system is essentially the same as that shown in FIG. 4 and all of the associated figures described above, except that the modified control stage of FIG. 8 is employed instead of the control stage of FIG. 7 just described. The control stage of FIG. 8 corresponds very closely with that of FIG. 7, but differs mainly in the elimination of the manual "add-subtract" switch 86 and the substitution of two lamp-photoconductor switches, and associated apparatus, for selecting the true or complement values for the R input. The lamps of these lamp photoconductor switches are indicated at 110 and 112. The associated apparatus consists mainly of a sign control unit indicated generally at 114.

Generally stated, the sign control unit 114 is capable of receiving a signal on one of the lines 116 indicative of the algebraic sign of data word R, and a signal on one of the lines 18 indicative of the algebraic sign of the data word A, and of accepting an order by the operator to algebraically "add" or "subtract." This order by the operator is delivered through manual pushbutton keys 120 and 122. Unit 114 determines from these inputs whether to take the true or complement value of data word R and determines the algebraic sign of the result of the addition or subtraction and indicates that sign value by a signal appearing on one of the output lines 124. It is possible also for the operator to cause the machine to perform the inverse of any add or subtract instruction if the operator first actuates the "modify" key 126. In an operation involving the addition of the complement of the R data word, that is, whenever the complement lamp 112 is actuated, if the A data word is smaller in absolute value than the R data word, a selector switch 126 must be moved to the upper position in order to give the proper result sign output, and the result must be recomplemented as explained above. Similarly, if the machine is to be used for multiplication by successive additions, the selector switch 127 must be shifted to the "Multiply" position in order to provide the correct result sign indication.

The detailed structure and operation of the sign control unit 114 is as follows: The sign signal from register A on connections 118 is received by neon lamps 128 and 130. Lamp 128 is energized if the A data word is positive, and lamp 130 is energized if the sign is negative. Similarly, though less directly, lamps 132 and 134 are respectively illuminated in response to a positive or negative sign of the data word R indicated at connections 116. This is true because lamp 136 will normally be illuminated so as to establish the completion of connections from the input lines 116 to the lamps 132 and 134 respectively through the associated photoconductors 136–1 and 136–2. Lamp 136 is energized when either the add or subtract switches 120 or 122 are closed so as to cause illumination of the respective lamps 138 or 140, the circuit to 136 being completed either through photoconductors 138–2 or 140–2. The add or subtract lamps 138 and 140 also cause the completion of circuits through their number 1 photoconductors and photoconductors associated with the register sign lamps 128 through 134 to cause the energization of either the true lamp 110 or the complement lamp 112. For instance, if the order is to "add," and the signs of both A and R inputs are positive, a circuit is completed through photoconductor 138–1 and photoconductors 132–1 and 128–1 to energize the true lamp 110. If the signs of both quantities are negative, the true lamp is again energized by a circuit from photoconductor 138–1 through photoconductors 134–2 and 130–2. However, if the signs are different the complement lamp 112 is energized, either by a circuit completed through photoconductors 132–1 and 130–1, or through photoconductors 134–2 and 128–2.

A true algebraic operation is also obtained if the order is to "subtract," and lamp 140 is illuminated in response to closure of subtract switch 122. The subtract order signal is transmitted through photoconductor 140–1 and if the signs of the two data words are the same, the "complement" lamp 112 is energized through circuits completed either through photoconductors 132–2 and 128–2 or 134–1 and 130–1. On the other hand, if the signs of the two data words are different, then the "true" lamp 110 is illuminated through circuits completed either through photoconductors 134–1 and 128–1, or through photoconductors 132–2 and 130–2. Particularly interesting features of this selector circuit are the cross connections indicated at 142 which permit double use of each of the eight associated photoconductors for switching both the add and subtract order signals either for like signs or unlike signs of the two data words.

If the order is given to modify the operation through the closure of switch 126, then the modify lamp 144 is illuminated and photoconductor 144–4 shorts out the lamp 136 so as to interrupt the sign circuits from register R through photoconductors 136–1 and 136–2. However, similar photoconductor circuits are completed through photoconductors 144–1 and 2. But the sense of the sign signal from register R is reversed. For instance, the plus line of 116 is connected through photoconductor 144–1 to energize the minus lamp 134. This reversal of sign of the R sign input will serve to reverse the sense of the operations ordered by the subsequent closure of either the add or subtract switches 120 and 122. The system is interlocked so that the modify switch 126 must be closed before, and not after, the "add" or "subtract" switches 120 and 122. Whenever the "add" or "subtract" switches are closed without prior closure of the modify switch 126, the lamp 136 is illuminated as described above. This illumination completes a circuit through photoconductor 136–3 to a latching lamp 146 which latches itself on through its own photoconductor 146–1. If the modify switch 126 is later closed, a circuit is caused to be completed through photoconductor 144–3 and photoconductor 146–2 to illuminate an error lamp 148. The operator is thus warned that an improper sequence of orders has been given. Because of the latching arrangement on lamp 146, through photoconductor 146–1, the error signal will be reliably supplied to error lamp 148, even though the lamp 136 is extinguished, after the illumination of lamp 146, by the shorting photoconductor 144–4. While a timer connection is not shown, it will be appreciated that power will be removed from the latching photoconductor 146–1 by the timer 82 after the completion of the current data word operation so that this interlock arrangement is available for protection of the system during each word cycle.

The sign of the result indicated on output connections 124 is generated by means of the single photoconductors associated with result sign driver lamps 148 and 150. Usually the sign of the result is the same as the sign of the data word from input A, and accordingly lamps 148 and 150 are usually energized through photoconductors associated with lamps 128 and 130. For this purpose, power is usually supplied to the plus output lamp 148 through a circuit completed through photoconductor 128–4, or to minus lamp 150 through a circuit completed through photoconductor 130–4 from a common connection indicated at 152. Power is supplied to connection 152 through a circuit including the lever and lower contact of switch 128, and either the "true" photoconductor 110–3, or the "complement" photoconductor 112–3 together with the lever and lower contact of switch 126. These circuits recognize the condition that when the system is in the addition or subtraction operating mode (as indicated by the setting of switch 128) the result sign will be the same as the sign of the A data word whenever the true value of R is used (as indicated by operation of lamp 110) or whenever the complemented value of R is used (as indicated by the operation of lamp 112) and the data word A is greater in absolute value than data word R (as indicated by switch 126). However, if data word A represents a value which is less than the value of the data word R, switch 126 must be shifted to the upper contact to cause the application of power to connection 154. This causes recognition of the fact that the sign of the result will be opposite to the sign of data word A, if the complement operation is called for by operation of lamp 112. This reversal of the result sign is accomplished through circuits completed by photoconductors 128–3 or 130–3 to energize the minus result lamp 150 in response to an A sign which is plus, or to energize the plus result lamp 148 if the A sign is minus.

If the system is employed for multiplication by successive addition, rather than for simple addition or subtraction, the switch 128 is shifted to the upper contact, and the correct result sign is derived by circuits which recognize whether the A and R data words have the same or different signs. Thus, if the signs are the same, the plus result sign lamp 148 is energized from the "multiply" contact of switch 128 through circuits completed either through photoconductors 128–5 and 132–4, or 130–5 and 134–3. However, if the two data words have opposite signs, then the negative result lamp 50 is energized through circuits completed by photoconductors 128–5 and 134–4, or through conductors 130–5 and 132–3.

While the invention has been particularly shown and described with reference to preferred embodiments thereof, it will be understood by those skilled in the art that various changes in form and details may be made therein without departing from the spirit and scope of the invention.

What is claimed is:

1. A photologic addition system comprising an addition matrix for receiving two numbers each expressed on a separate set of N input terminals in a one out of N code in terms of an electrical signal on one out of N input terminals, each of the input termnials for one of said numbers having a single voltage responsive light source connected thereto, a plurality of photoresponsive devices arranged in proximity to each of said light sources, a separate one of said photoresponsive devices associated with each of said light sources being connected to each of said input terminals for the other one of said numbers, a plurality of matrix output connections corresponding to each of the possible values of the sum of the two input numbers for expression of said sum in a one out of N code, each of said photoconductors having a connection to one of said output connections corresponding to the value of the sum indicated by the coincidence of input signals on that photoresponsive device and on the voltage responsive light source with which it is associated.

2. A photologic addition system comprising an addition matrix for receiving two numbers each expressed in a one out of N code in terms of an electrical signal on one out of N input terminals, each of the input terminals for one of said numbers having a separate voltage responsive light source connected thereto, a plurality of photoresponsive devices arranged in proximity to each of said light sources, a separate one of said photoresponsive devices associated with each of said light sources being connected to each of said input terminals for the other one of said numbers, a plurality of matrix output connections corresponding to each of the possible values of the sum of the two input numbers for expression of said sum as a unique signal on one of said output connections, each of said photoconductors having a connection to one of said output connections corresponding to the value of the sum indicated by the coincidence of input signals on that photoresponsive device and on the voltage responsive light source with which it is associated, the matrix input connections for each of said numbers having a separate input network connected thereto, each of said networks including a voltage responsive light source for each of the possible values of the number to be represented, each of said networks including at least a first set of photoresponsive devices, a true value voltage bus for each of said networks, all of said devices of said first set being commonly connected to said true value voltage bus for energization thereby when the true value is required, each of said devices of said first set being associated with a different one of said network light sources and connected to said matrix input connections for transmitting a true value of the input function indicated by the energization of one of said network light sources, at least one of said networks including a second set of photoresponsive devices commonly connected to a complement value voltage bus for energization when the complement value is required as an alternative to the true value, said second set of devices including a separate device arranged in proximity to each of the associated network light sources and being respectively connected to matrix input connections corresponding to complement functions of the value indicated by the energization of the network light sources to thereby cause addition of the complement to obtain the difference between the input numbers.

3. A decimal photologic serial adder-subtractor for successively combining the decimal digits of two numbers designated A and R, each digit being expressed by a signal on one out of ten lines, the input lines for said R digit each having a separate voltage responsive light source connected thereto to form a part of an R input network, said R network including four distinct sets of photoconductors, each of said photoconductor sets including one photoconductor arranged in proximity to each one of said light sources to receive illumination therefrom, each member of the first of said sets of photoconductors being commonly connected to an add with no carry bus to receive voltage signals therefrom and being connected to the R network output connections corresponding to the true values of the R function, each member of the second of said sets of photoconductors being commonly connected to an add with carry bus to receive voltage signals therefrom and being connected to supply signals to the R network output connections corresponding to the true values of the R function plus one, each member of the third of said sets of photoconductors being commonly connected to a subtract with no borrow bus for receiving voltage signals therefrom and being connected to supply said signals to the R network output connections corresponding to the tens complement of the R function, each member of the fourth set of said photoconductors being commonly connected to a subtract with borrow bus for receiving voltage signals therefrom and being connected to supply signals therethrough to the output connections of the R network corresponding to the nines complement of the R function, an adder matrix connected to receive the signals from the output connections of the R input network and the A function signals and to form the sum thereof, each of the matrix input terminals for one of said functions having a separate voltage responsive light source connected thereto, a plurality of photoresponsive devices arranged in proximity to each of said light sources, a separate one of said photoresponsive devices associated with each of said light sources being connected to each of said input terminals for the other one of said input functions, matrix output terminals corresponding to each of the possible values of the sum of the two input numbers for expression of said sum in a one out of twenty code, each of said photoconductors being connected to one of said matrix output terminals corresponding to the value of the sum indicated by the coincidence of input signals on that photoresponsive device and on the voltage responsive light source associated therewith, an output stage connected to said matrix output terminals connected and arranged to convert said matrix output from a one out of twenty code representation to a one out of ten code digit sum signal plus a signal signifying one of the two conditions of a sum value above nine and not above nine; a control stage connected and arranged to receive and store said above nine and not above nine signals and operable during the succeeding digit cycle for supplying to said carry bus a signal derived from said above nine signal and for supplying to said no carry bus a signal derived from said not above nine signal for operation of the system when adding, and for supplying to said no borrow bus a signal derived from said above nine signal and for supplying to said borrow bus a signal derived from said not above nine signal for operation of the system when subtracting.

4. A serial adder system comprising a matrix having eleven photologic switching combinations corresponding to eleven possible values of an R input function, each combination consisting of a voltage responsive lamp and a plurality of photoconductors arranged in proximity to said lamp to receive illumination therefrom, said lamps each being connected to a different input terminal for receiving voltage signals to indicate the R input function value in terms of a unique signal condition on one of said terminals, each of said combinations including a separate photoconductor connected to each of ten input terminals for receiving a signal indicating an A input function value in terms of a unique signal on one of said last named terminals, said matrix including twenty output terminals for indicating the sum of functions A and R in a one out of twenty code, each of said photoconductors being connected to one of said output terminals corresponding to the sum value which it represents.

5. A serial by digit arithmetic system comprising at least two input stages for receiving A and R values in terms of a unique signal condition on one out of N input connections, at least said R input stage being connected and arranged to selectively provide one of the following functions of its input value: the true value plus one, the true value, the N complement function, and the N minus one complement function; all of said functions being expressed by a unique signal on one out of a set of N plus one function R output connections, said A input stage being arranged to produce at least the true value function of A by a unique signal on one out of a set of at least N function A output connections, an adder matrix including at least N photologic switching combinations each comprising a voltage responsive lamp and a plurality of photoconductors arranged to receive illumination therefrom to provide a drop in impedance therein, each of said lamps being connected to a different member of one of said sets of output connections, each of said combinations including a separate one of said photoconductors connected to each of said output connections of the other of said sets, said adder matrix including 2N output terminals for indicating the sum of said A and R functions in a one out of 2N code, each of said photoconductors being connected to one of said matrix output terminals corresponding to the sum value which it represents, an output stage connected to said matrix output terminals connected and arranged to convert said matrix output from a one out of 2N code representation to a one out of N code digit sum signal plus a signal signifying one of the two conditions of a sum value above the Nth value and not above the Nth value; a control stage connected and arranged to receive and store said above the Nth value and not above the Nth value signals and operable during the succeeding digit cycle for supplying to said R input stage a carry signal derived from said above the Nth value signal and a not carry signal derived from said not above the Nth value signal for operation of the system when adding, and for supplying a no borrow signal derived from said above the Nth value signal and a borrow signal derived from said not above the Nth value signal for operation of the system when subtracting, said R input stage being operable in response to said last mentioned signals for respectively generating said aforementioned R functions.

6. A serial by digit arithmetic system comprising a plurality of photologic switching combinations each comprising a voltage responsive lamp and at least one photoconductor arranged to receive illumination therefrom to provide a drop in impedance therein, said system including at least two input stages for receiving A and R values in terms of a unique signal condition on one out of N input connections, at least said R input stage including a plurality of said combinations each having a plurality of photoconductors connected and arranged to selectively provide one of the following functions of its input value: the true value plus one, the true value, the N complement function, and the N minus one complement function; all of said functions being expressed by a unique signal on one out of a set of N plus one function R output connections, said A input stage being arranged to produce at least the true value function of A by a unique signal on one out of a set of at least N function A output connections, an adder matrix including at least N of said photologic switching combinations, each of the lamps of said matrix photologic combinations being connected to a different member of one of said sets of output connections, each of said matrix combinations including a separate photoconductor connected to each of said output connections of the other of said sets, said adder matrix including 2N output terminals for indicating the sum of said A and R functions in a one out of 2N code, each of said matrix combination photoconductors being connected to one of said matrix output terminals corresponding to the sum value which it represents, an output stage connected to said matrix output terminals and including a plurality of said photologic switching combinations connected and arranged to convert said matrix output from a one out of 2N code representation to a one out of N code digit sum signal plus a signal signifying one of the two conditions of a sum value above the Nth value and not above the Nth value; a control stage connected and arranged to receive and store said above the Nth value and not above the Nth value signals and operable during the succeeding digit cycle for supplying to said R input stage a carry signal derived from said above the Nth value signal and a no carry signal derived from said not above the Nth value signal for operation of the system when adding, and for supplying a no borrow signal derived from said above the Nth value signal and a borrow signal derived from said not above the Nth value signal for operation of the system when subtracting, said R input stage being operable in response to said last mentioned signals for respectively generating said aforementioned R functions.

7. A serially operable adder system comprising a plurality of photologic switching combinations, each combination comprising a voltage responsive lamp and at least one photoconductor arranged in proximity to said lamp to receive illumination therefrom to provide a change in photoconductor impedance for switching purposes, said system comprising an adder matrix for receiving a separate photoconductor connected to each of said set of at least N input connections in terms of a unique signal condition on one of said connections, said adder matrix including at least N of said photologic switching combinations, each of said lamps of said matrix combinations being connected to a different member of one of said sets of input connections for receiving said function signals thereon, each of said matrix combinations including a separate photoconductor connected to each of said input connections of the other of said sets for receiving said function signals thereon, said adder matrix including 2N output terminals for indicating the sum of said A and R functions in a one out of 2N code, each of said matrix combination photoconductors being connected to one of said matrix output terminals corresponding to the sum value which it represents, an output stage connected to receive the output of said matrix and arranged to convert said matrix output from a one out of 2N code representation to a one out of N code digit sum signal plus an additional signal in a one out of two code signifying one of the two conditions of a sum value above the Nth value and a sum value not above the Nth value; a control stage connected and arranged to receive and store said above the Nth value and not above the Nth value signals and for supplying a no carry signal derived from said not above the Nth value signal and for supplying a carry signal derived from said above the Nth value signal to raise the R digit function value supplied to said matrix during the succeeding digit cycle.

8. A serially operable subtraction system comprising a plurality of photologic switching combinations, each combination comprising a voltage responsive lamp and at least one photoconductor arranged in proximity to said lamp to receive illumination therefrom to provide a change in photoconductor impedance for switching purposes, said system comprising an adder matrix for receiving successive A and R digit functions each expressed on a separate set of at least N input connections in terms of a unique signal condition on one of said connections, said R digit function being a complement of an R value, said adder matrix including at least N of said photologic switching combinations, each of said lamps of said matrix combinations being connected to a different member of one of said sets of input connections for receiving said function signals thereon, each of said matrix combinations including a separate photoconductor connected to each of said input connections of the other of said sets for receiving said function signals thereon, said adder matrix including 2N output terminals for indicating the sum of said A and R functions in a one out of 2N code, each of said matrix combination photoconductors being connected to one of said matrix output terminals corresponding to the sum value which is represents, an output stage connected to receive the output of said matrix and arranged to convert said matrix output from a one out of 2N code representation to a one out of N code digit signal plus an additional signal in a one out of two code signifying one of the two conditions of an output value above the Nth value and an output value not above the Nth value; a control stage connected and arranged to receive and store said above the Nth value and not above the Nth value signals and for controlling the nature of the R digit function supplied to said matrix during the succeeding digit cycle to be the Nth complement of the R digit value in response to said above the Nth value signal and to be the N minus one complement in response to said not above the Nth value signal to indicate a borrow.

9. A serial photologic arithmetic system selectively operable for addition or subtraction comprising a plurality of photologic switching combinations, each combination comprising a voltage responsive lamp and at least one photoconductor arranged in proximity to said lamp to receive illumination therefrom to provide a change in photoconductor impedance for switching purposes, said system comprising at least two input stages for receiving A and R values in a one out of N code in terms of a unique signal condition on one out of N input connections, at least the input stage for said R value including a plurality of said photologic switching combinations each having a plurality of photoconductors connected and arranged to provide in response to appropriate function selection signals one of the following functions of its input value: the true value for addition with no carry, the true value plus one for addition with carry, the N complement function for subtraction with no borrow, and the N minus one complement function for subtraction with borrow; all of the possible N plus one values of said functions being expressed in an N plus one code in terms of a unique signal on one out of a set of N plus one function R output connections, said A input stage being arranged to produce at least the true value function of the A value by a unique signal on one out of a set of at least N function A output connections, an adder matrix connected to receive said A and R functions and including at least N of said photologic switching combinations, each of said lamps of said matrix combinations being connected to a different member of one of said sets of output connections for receiving said function signals thereon, each of said matrix combinations including a separate photoconductor connected to each of said output connections of the other of said sets for receiving said function signals thereon, said adder matrix including 2N ouput terminals for indicating the sum of said A and R functions in a one out of 2N code, each of said matrix combination photoconductors being connected to one of said matrix output terminals corresponding to the sum value which it represents, an output stage connected to receive the output on said matrix output terminals and including a plurality of said photologic switching combinations connected and arranged to convert said matrix output from a one out of 2N code representation to a one out of N code digit sum signal plus an additional signal in a one out of two code signifying one of the two conditions of a sum value above the Nth value and a sum value not above the Nth value; a control stage connected and arranged to receive and store said above the Nth value and not above the Nth value signals and operable during the succeeding digit cycle for supplying to said R value input stage said aforementioned function selection signals as follows: a carry signal derived from said above the Nth value signal and a no carry signal derived from said not above the Nth value signal for operation of the system when adding, and a no borrow signal derived from said above the Nth value signal and a borrow signal derived from said not above the Nth value signal for operation of the system when subtracting.

10. A serial by digit arithmetic system selectively operable for addition or subtraction comprising a plurality of photologic switching combinations each comprising a voltage responsive lamp and at least one photoconductor arranged to receive illumination therefrom to provide a drop in impedance therein, said system including at least two input stages for receiving A and R values in terms of a unique signal condition on one out of ten input connections, at least said R input stage including at least ten of said combinations each having a plurality of photoconductors connected and arranged to selectively provide one of the following functions of its input value: the true value plus one, the true value, the tens complement function, and the nines complement function; all of said functions being expressed by a unique signal on one out of a set of eleven function R output connections, said A input stage being arranged to produce at least the true value function of A by a unique signal on one out of a set of ten function A output connections, an adder matrix including at least ten of said photologic switching combinations, each of the lamps of said matrix photologic combinations being connected to a different member of one of said sets of output connections, each of said matrix combinations including a separate photoconductor connected to each of said output connections of the other of said sets, said adder matrix including twenty output terminals for indicating the sum of said A and R functions in a one out of twenty code, each of said matrix combination photoconductors being connected to one of said matrix output terminals corresponding to the sum value indicated by the coincidence of a voltage signal input to that photoconductor and the illumination of the lamp associated therewith, an output stage connected to said matrix output terminals and including a plurality of said photologic switching combinations connected and arranged to convert said matrix output from a one out of twenty code representation to a one out of ten code digit sum signal plus a signal signifying one of the two conditions of a sum value above nine and not above nine; a control stage connected and arranged to receive and store said above the nine value and not above the nine value signals and operable during the succeeding digit cycle for supplying to said R input stage a carry signal derived from said above nine value signal and a no carry signal derived from said not above nine value signal for operation of the system when adding, and for supplying a no borrow signal derived from said above nine value signal and a borrow signal derived from said not above nine value signal for operation of the system when subtracting, said R input stage being operable respectively in response to said four last mentioned signals to supply the previously mentioned R functions as follows: the true value plus one, the true value, the tens complement, and the nines complement.

References Cited in the file of this patent

Marshall, Jr., et al.: (1) Research on Electro-Optical and Magnetic Core Logic, National Cash Register Company Research Division (43 pages, September 1957), ASTIA Document No. AD 142017.

Marshall, Jr., et al.: (2) Interim Research Report No. 3 on Phosphor Photoconductor Studies (period Feb. 1, through April 1, 1957), National Cash Register Company Research Analysis Department. (16 pages. This publication is cited on page 32 of Marshall, Jr., et al. (1) cited supra.)

UNITED STATES PATENT OFFICE
CERTIFICATE OF CORRECTION

Patent No. 3,138,704 June 23, 1964

Rex Rice

It is hereby certified that error appears in the above numbered patent requiring correction and that the said Letters Patent should read as corrected below.

Column 7, line 40, after "for" insert -- in --; column 10, line 49, for "18" read -- 118 --; column 16, line 10, strike out "a separate photoconductor connected to each of said" and insert instead -- successive A and R digit functions each on a separate --.

Signed and sealed this 16th day of February 1965.

(SEAL)
Attest:

ERNEST W. SWIDER
Attesting Officer

EDWARD J. BRENNER
Commissioner of Patents